Figure 1:
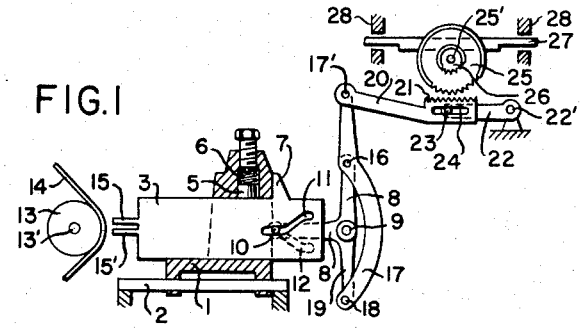

March 1, 1960 K SCHEIBEL ET AL 2,926,703
CONTROLLING DEVICE, ESPECIALLY AN AUTOMAT FOR CONTROLLING
MOVEMENTS OF A CONTROLLABLE ELEMENT OF A TEXTILE MACHINE
Filed April 14, 1955 7 Sheets-Sheet 1

INVENTORS
KURT SCHEIBEL and
ALBECHT BOHMANN

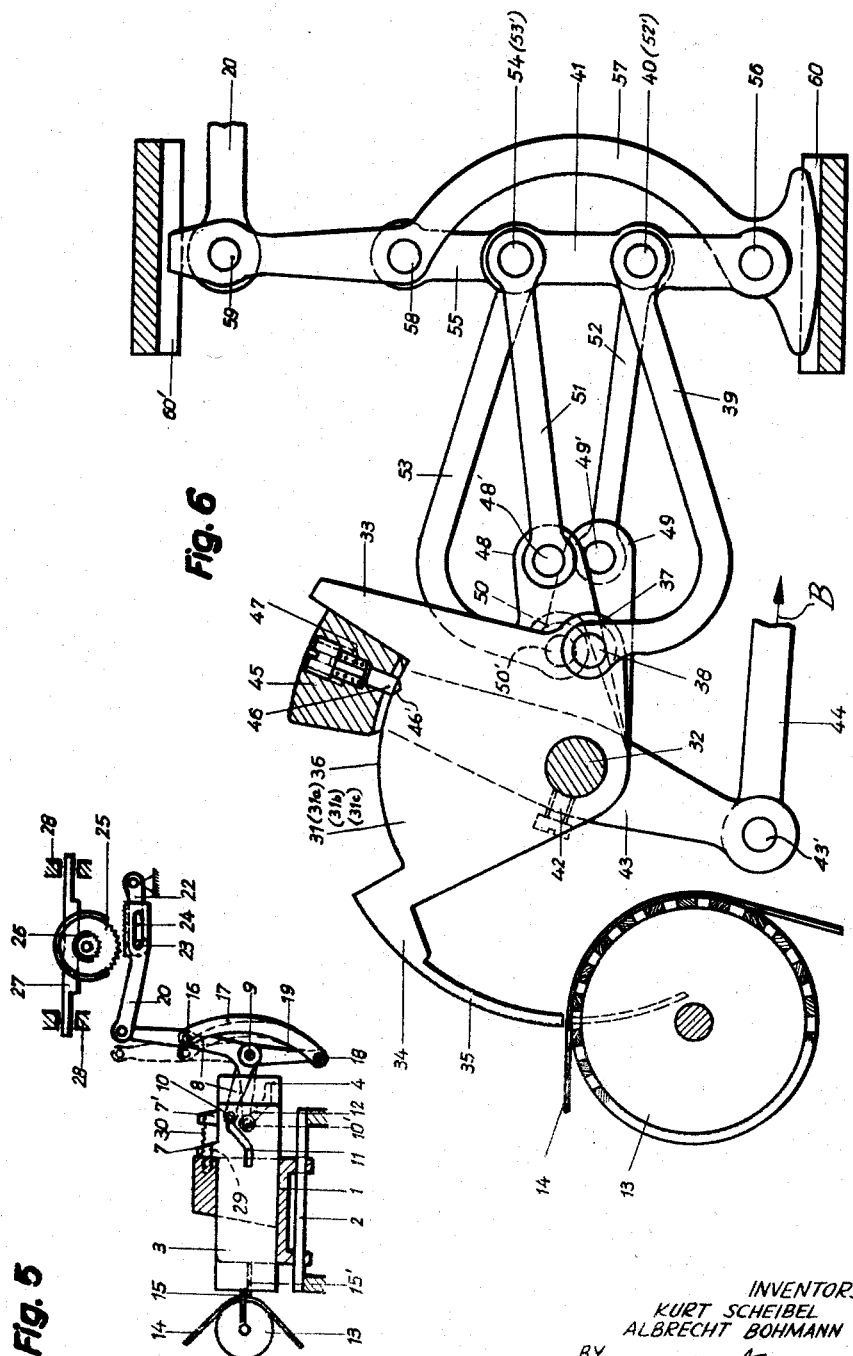

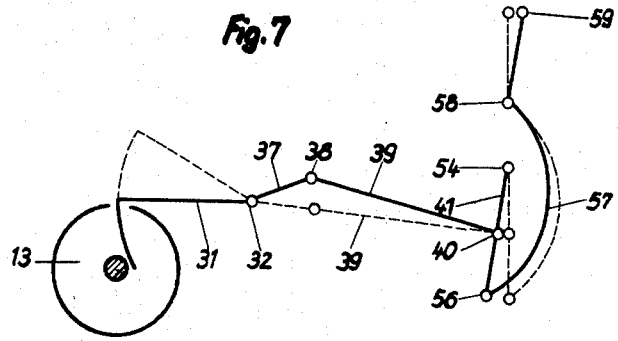
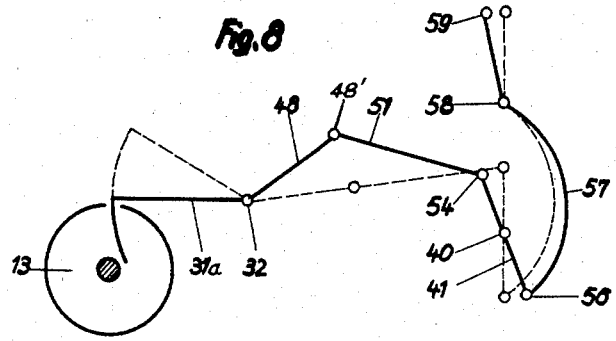
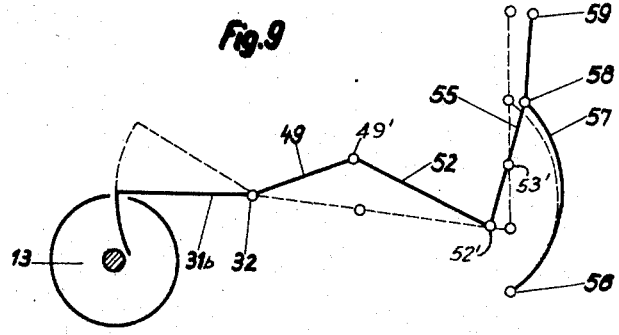
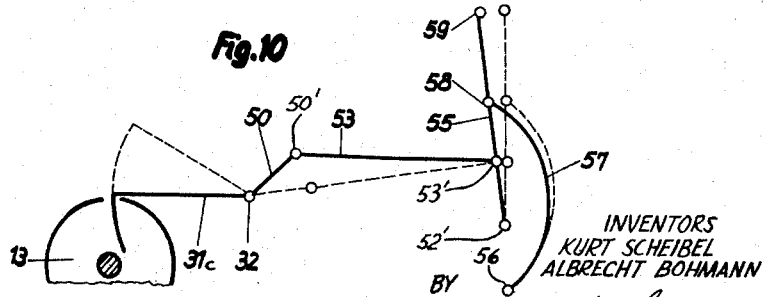

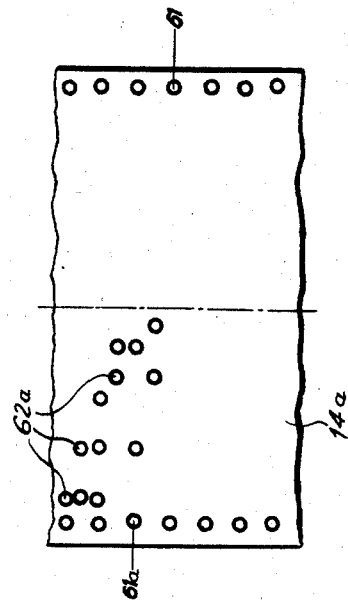
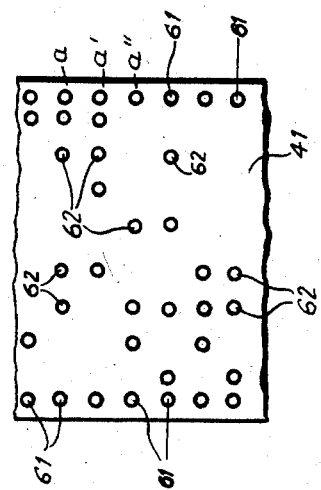

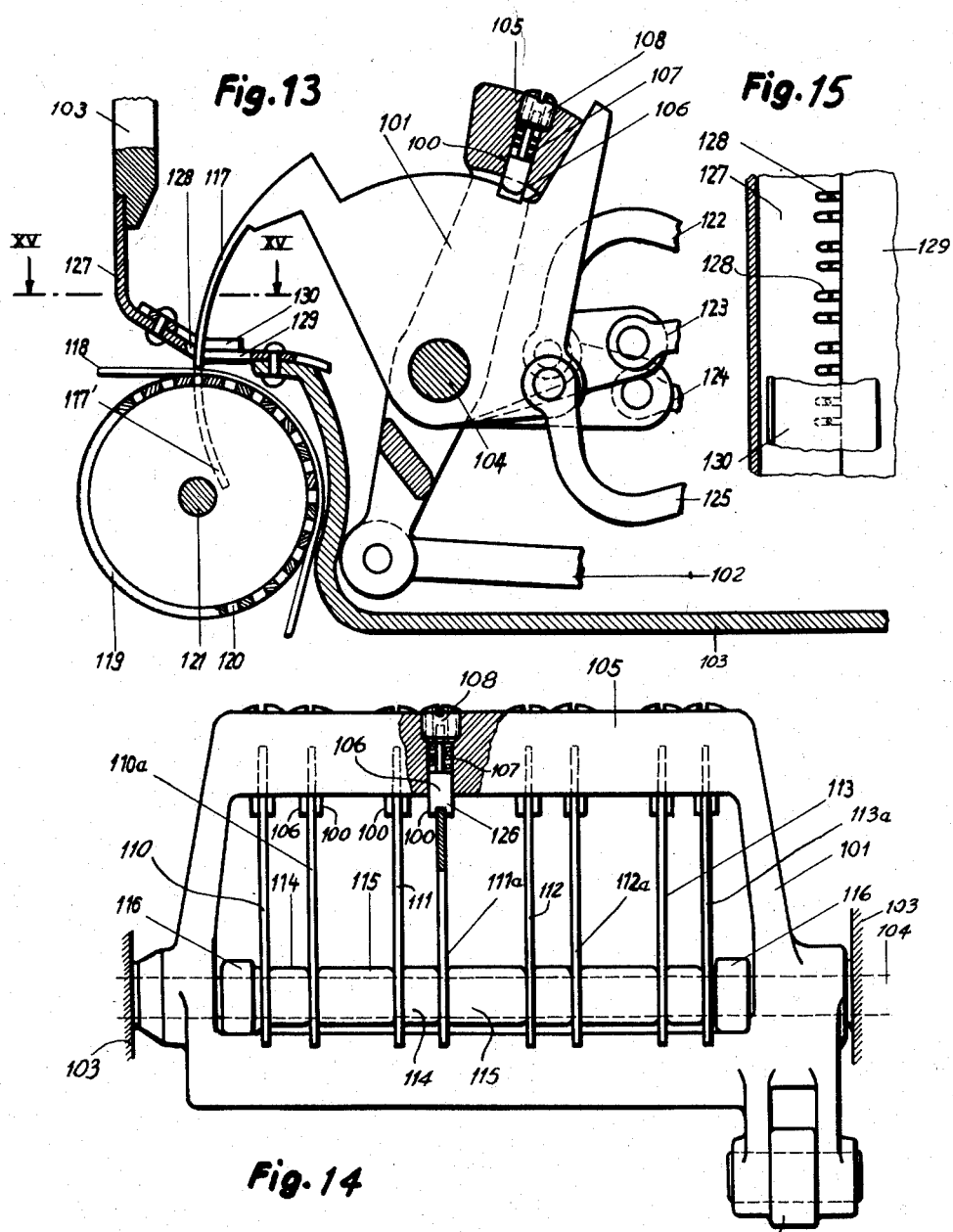

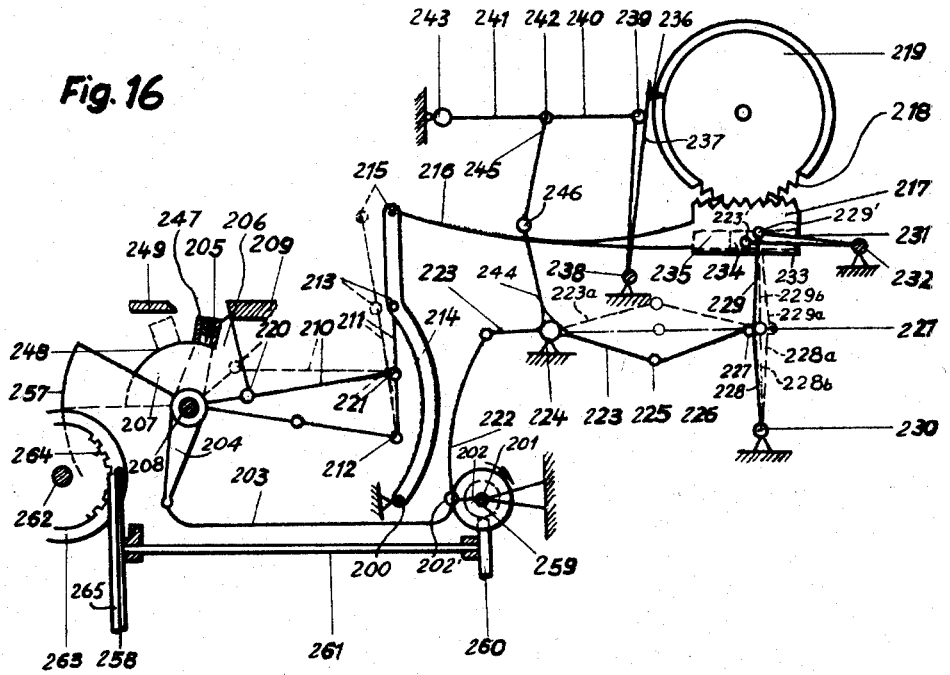
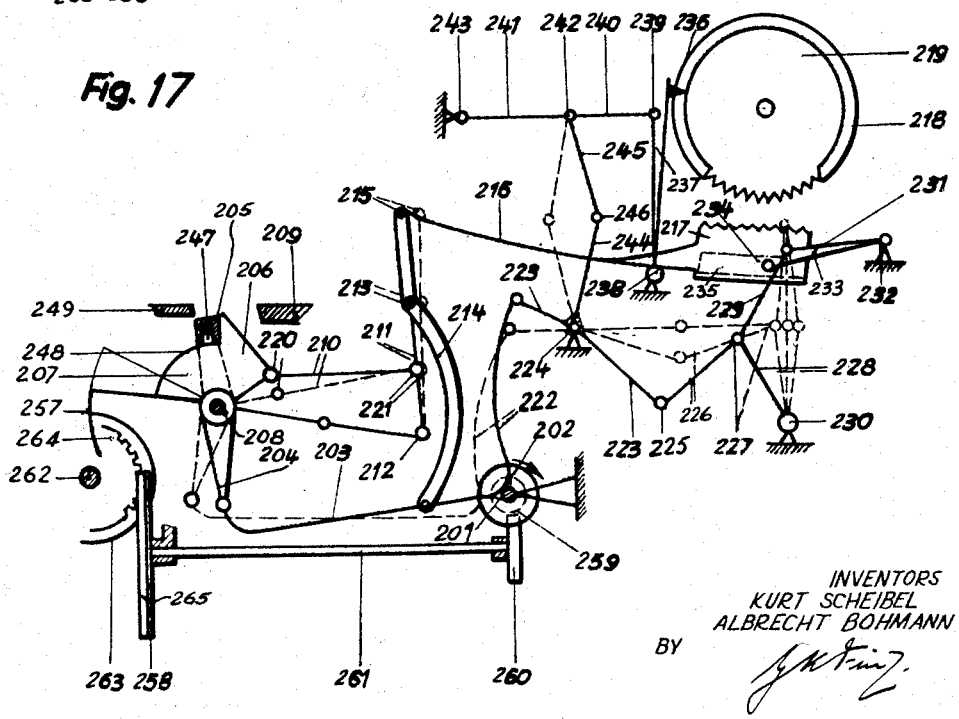

INVENTORS
KURT SCHEIBEL
ALBRECHT BOHMANN
BY
ATTORNEY

United States Patent Office 2,926,703
Patented Mar. 1, 1960

2,926,703

CONTROLLING DEVICE, ESPECIALLY AN AUTOMAT FOR CONTROLLING MOVEMENTS OF A CONTROLLABLE ELEMENT OF A TEXTILE MACHINE

Kurt Scheibel and Albrecht Bohmann, Dresden, Germany, assignors to VEB Spezialnahmaschinenwerk Limbach, Limbach-Oberfrohna, Germany Application April 14, 1955, Serial No. 501,323

20 Claims. (Cl. 139—317)

This invention relates to controlling devices, and more particularly to a controlling device wherein movements of different degrees may be imparted to its setting means.

A mechanism according to the invention is especially adapted for use in a Jacquard automat of a textile machine, such as an embroidery machine, wherein the jacks of the Jacquard automat, each jack carrying a pin, cooperate with Jacquard cards having a plurality of holes.

In the hitherto customary Jacquard automats, the Jacquard cards are moved towards the jacks, so that the latter are displaced, when they are engaged by a non-perforated portion of the Jacquard card, while a jack being in register with a hole of the Jacquard card remains in its position. In many instances, for example for the control of the mechanisms of an embroidery machine, the number of jacks remaining in their positions at certain intervals during the operation of the machine is rather large, so that a great number of holes must be punched into the Jacquard cards. On the other hand, the stability and durability of Jacquard cards with a great number of holes is rather small, so that the Jacquard cards are worn out after a comparatively short time of use. Furthermore, the machines for producing Jacquard cards with a great number of holes and the driving mechanisms of the hitherto customary Jacquard automats, especially for use in connection with embroidery machines are rather complicated and are subjected to great stress.

An object of the invention is to provide a controlling device, by means of which the above mentioned disadvantages are avoided.

Another object of the invention is to provide a controlling mechanism for use in a Jacquard automat which is of simple construction.

A further object of the invention is to provide a mechanism for use in a Jacquard automat by means of which those jacks are displaced from their original position which are in register with a hole of the Jacquard card, while the jacks engaged with non-perforated parts of the Jacquard card remain in their feeling position.

Another object of the invention is to provide a controlling mechanism for use in a Jacquard automat, wherein the movable jacks are perfectly guided so that an accurate cooperation of the pins of the jacks with the holes and non-perforated portions of the Jacquard cards is assured.

A further object of the invention is to provide a controlling mechanism for use in Jacquard automats which may be operated at high speeds, so that textile machines, for example an embroidery machine, controlled by such a Jacquard automat may be operated at high speed.

Figure 2:
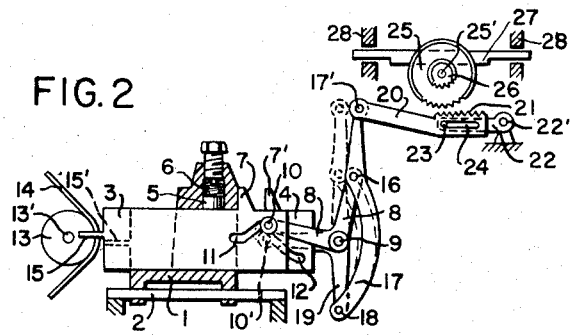
Figure 3:
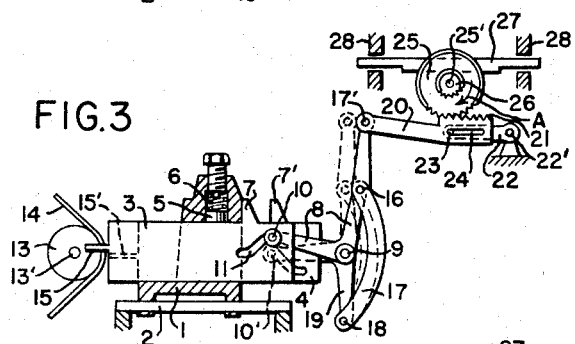
Figure 4:
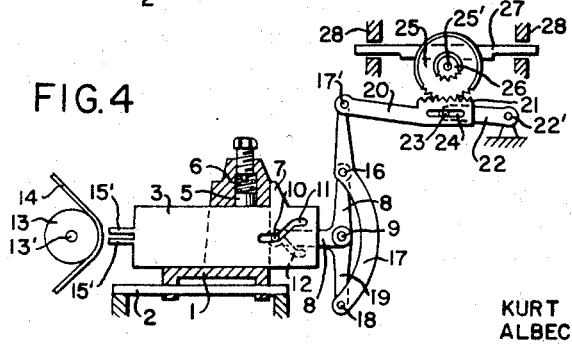
Figure 18:
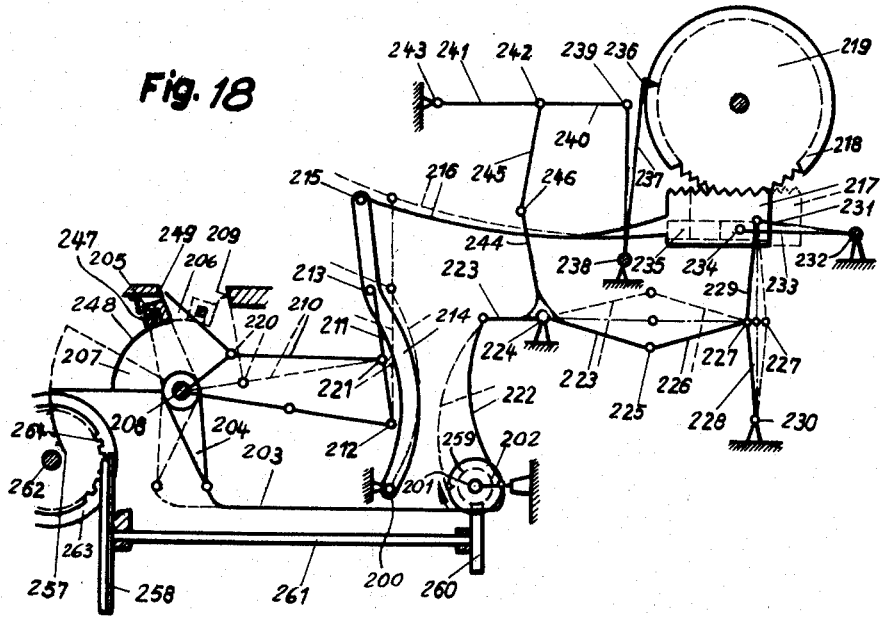
Figure 20:
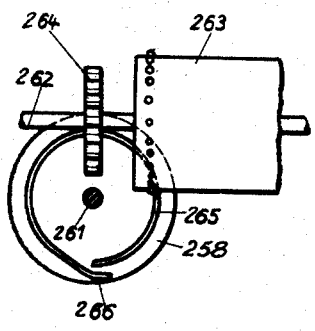
Figure 19:
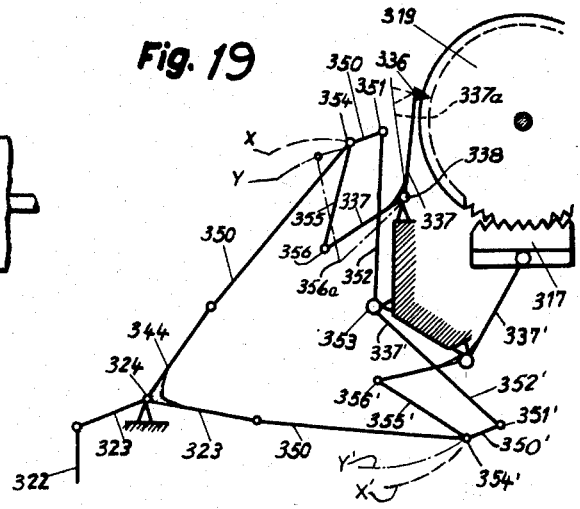

Other objects and structural details of the invention will be apparent from the following description when read in conjunction with the accompanying drawings forming part of this specification, wherein:

Fig. 1 is a side elevational view, partly in section, of a controlling device according to the invention, Figs. 2–4 are side elevational views, partly in section, of the controlling device shown in Fig. 1, wherein, however, the elements thereof are in different positions, Fig. 5 is a side elevational view, partly in section, of a different embodiment of a controlling device according to the invention, Fig. 6 is a side elevational view, partly in section, of a further embodiment of the invention, Figs. 7–10 are diagrammatical illustrations of the mechanism shown in Fig. 6, the elements of the mechanism being in different positions, Fig. 11 is a fragmentary top plan view of a Jacquard card used in connection with a device according to the invention, Fig. 12 is a fragmentary top plan view of another embodiment of a Jacquard card, Fig. 13 is a vertical fragmentary sectional view of another embodiment of a controlling device according to the invention, Fig. 14 is a side elevational view, partly in section, of the controlling device shown in Fig. 13, Fig. 15 is a fragmentary sectional view taken along line XV—XV of Fig. 13, Fig. 16 is a side elevational view, partly in section, of a detail of a controlling device according to the invention, Figs. 17 and 18 are side elevational views of the detail shown in Fig. 16, wherein, however, the elements thereof are in different positions, Fig. 19 is a side elevational view of a different embodiment of a link-system for actuating the rack and the locking element shown in the detail of Fig. 18, and Fig. 20 is an elevational view of the mechanism for advancing the drum of the Jacquard automat as seen in the direction of the arrow XX of Fig. 16.

Hereinafter, the controlling mechanism according to the invention is described in connection with a Jacquard automat, especially a Jacquard automat for an embroidery machine, but it is understood that the controlling mechanism according to the invention may also be applied to different types of machines.

Referring now to Figs. 1–4, the numeral 1 indicates a slide reciprocably mounted on rods 2 (only one rod being shown) carried by a stationary part of the device. The slide 1 may be reciprocated by a drive, for example by a crank drive connected with the power driven main shaft of the device. Jacks 3 for the transmission of a positive movement and jacks 4 for the transmission of a negative movement are slidably mounted on said slide 1. Each of the jacks 3 and 4 is held on the slide 1 by means of a pressing element 5 urged against the upper edge of the associated jack by means of a spring 6. Furthermore each of the jacks 3 and 4 is provided with a projecting dog or nose 7, 7' respectively at its upper edge. Said dog or nose 7 is in abutting engagement with a portion of the slide 1 when the respective jack is in its original or zero position as shown in Fig. 1.

Each jack 3 (only one being shown in Figs. 1–4) has a curved slot 11 slidably engaged with a pin 10 carried by a bell-crank lever 8 swingably mounted on a rod 9 mounted on a stationary portion of the device. Furthermore each jack 4 (only one being shown in Figs. 1–4) has a curved slot 12 slidably engaged with a pin 10' carried by a bell-crank lever 19 also swingably mounted on the said rod 9.

A hollow drum 13 for advancing a Jacquard card band 14 is arranged opposite to the jacks 3 and 4. The hollow drum 13 keyed to a rotatable shaft 13' is rotated step by step in accordance with the pitch of the Jacquard card 14. For example, the drum 13 may be intermittently advanced by a mechanism as shown in Figs. 16 and 20. The drum 13 is provided with a plurality of rows of holes which correspond to its intermittent feed motion.

While the Jacquard card 14 has only a restricted number of holes 62 in each of its rows a, a', a" of holes (see Fig. 11), each row of holes of the drum 13 has the full amount of holes arranged from one end to the other.

The jack or carrier member 3 carries a pin or feeler 15 at its left hand end facing the drum 13 as viewed in Figs. 1–4. Likewise, the jack or carrier member 4 carries a pin or feeler 15'. When said pins 15 and 15' are in register with a hole of the Jacquard card 14, they may pass through such a hole of the Jacquard card 14 and through a corresponding hole of the drum 13. Although, for the sake of better illustration, Figs. 1–4 illustrate the pins 15 and 15' at different levels, it is to be understood that in the actual device both pins 15 and 15' are arranged at the same level in a horizontal row. This is in contrast to the arrangement of the pins in hitherto customary devices which—in the same manner as the device according to the invention—operate with a pitch according to a geometrical progression.

When the slide 1 is moved by its drive from the position shown in Fig. 1 into the position shown in Fig. 2, the jack 4 remains in its original position, if its pin 15' abuts against a non-perforated portion of the Jacquard card 14. In such an event, the spring-loaded presser 5 arranged in the moving slide 1 slides along the upper edge of the jack 4.

The slide or engaging means 1 moved by its drive, however, takes along the jack 3 by means of the spring-loaded presser 5, so that as the pin 15 of jack 3 passes through one of the registering holes of the Jacquard card 14 and the drum 13, the jack or carrier member 3 reaches the position shown in Fig. 2. During this displacement of the jack 3 the bell-crank lever 8 is rocked in clockwise direction about its pivot 9 by means of the slot 11 of the jack 3 cooperating with the pin 10 carried by one arm of said bell-crank lever 8. The other arm of said bell-crank lever 8 is pivoted at 16 to an intermediate point of a lever 17, the lower end of which is pivoted at 18 to the downwardly extending arm of the bell-crank lever 19. Since said bell-crank lever 19 is at a standstill while the jack 4, which is connected with the other arm of said bell-crank lever 19 by the pin-and-slot connection 10', 12, remains in its original position, the pivot 18 acts as a fulcrum for the lever 17, so that the latter is swung about said pivot 18 in clockwise direction from the position shown in Fig. 1 in full lines (and in Fig. 2 in dash lines) into the position shown in Fig. 2 in full lines. The upper end of the lever 17 is pivoted at 17' to one end of a link 20 having a rack 21 at its other end. Said other end of the link 20 is movably connected through a pin-and-slot connection 23, 24 with one end of a link 22 swingably mounted on a stationary point of the device at 22'.

The rack 21 is arranged for cooperation with a gear 25 keyed to a rotatable shaft 25'. A pinion 26 keyed to said shaft 25' is in mesh with another rack 27 reciprocably arranged in bearings 28 of the device. The rack 27 may be operatively connected with means (not shown) for adjusting or displacing a member, for example the embroidering frame of an embroidery machine. The rack 21 may be engaged with and disengaged from the gear 25 by an automatic mechanism (not shown in Figs. 1–4), which, for example may be of the type shown in Figs. 16–18. Upon engagement of the rack 21 with the gear 25 and a displacement of the rack 21 the gear 25 is rotated so as to cause a displacement of the second rack 27 controlling the member to be adjusted.

In the positions shown in Figs. 1 and 2, the rack 21 is disengaged from the gear 25.

Fig. 3 illustrates the position when the slide 1 starts its return movement into its original position. At that moment the automatic mechanism (not shown in Fig. 3) acting on the rack 21 has the latter brought into engagement with the gear 25 as shown in Fig. 3. During the return movement of the slide 1 the latter causes a return movement of the jack or carrier member 3 into its original position by its abutting engagement with the dog or nose 7 of said jack 3, while the spring-loaded presser 5 arranged in the slide 1 and engaged with the jack 4 being in its original position slides along the upper edge of said jack 4. Furthermore, the jack 3 returning into its original position causes a swinging of the lever 17 about its pivot 18 into its original position (shown in dash lines in Fig. 3), whereby the gear 25 is rotated in clockwise direction (arrow A) by means of the rack 21.

Fig. 4 illustrates the position of the elements at the end of the return stroke of the slide 1, the rack 21 still being in engagement with the gear 25. The automatic mechanism (not shown in Fig. 4) controlling the engagement and disengagement of the rack 21, however, causes a disengagement of the rack 21 from the gear 25 shortly before a new stroke of the slide in left hand direction, whereby, again, the position of the elements shown in Fig. 1 is obtained. Now, a new cycle of operations may be carried out.

If, during such a new cycle of operation the jack 3 is held in its original position by the engagement of its pin 15 with a non-perforated portion of the Jacquard card 14, while the jack 4 is taken along by the stroke of the slide 1 in left hand direction, the lever 17 is swung in counter-clockwise direction by the bell-crank lever 19 about the pivot 16, which now is held in a fixed position by the jack 3 remaining in its original position. Thus, upon engagement of the rack 21 with the gear 25 and return movement of the slide 1 into its original position the gear 25 controlling the second rack 27 is rotated in counter-clockwise direction.

The embodiment of a controlling device shown in Fig. 5 is substantially the same as that shown in Figs. 1–4. However, the spring-loaded pressers 5 of Figs. 1–4 are replaced by springs 29 and 30 respectively connected with the slide 1 and the dogs or noses 7 and 7' respectively of the jacks 3 and 4 respectively. If, for example, during a movement of the slide 1 in left hand direction a jack 4 remains in its original position, the associated spring 30 is stretched, while the jack 3 is moved along with the slide 1 by means of the associated spring 29 urging the dog or nose 7 of the jack 3 against the slide 1, when the pin 15 of the jack 13 may pass through a hole of the Jacquard card 14 and drum 13.

According to the embodiment illustrated by Figs. 6–10 each of the jacks 31, 31a, 31b, 31c is in the shape of a segment rotatably mounted on a shaft 32. Each jack is provided with a recess 36 (Fig. 6) having a curved bottom surface with a radius passing through the center of the shaft 32. The end walls 33 and 34 of said recess 36 may act as abutments for a member 45 attached to a lever 43 secured to the rotatable shaft 32 by means of a screw 42. The left hand end (as viewed in Fig. 6) of the jack 31 has a curved extension 35 in the shape of a curved pin. The radius of said curved pin or feeler being larger than the radius of the bottom surface of the recess 36 likewise passes through the center of the shaft 32. Thus the arm of the lever of the pin 35 determining the force exerted by the pin 35 on a non-perforated portion of the Jacquard card 14 trained around the drum 13 is substantially increased whereby damage to the Jacquard card 14 caused by the pin 35 during operation of the device is considerably reduced.

Furthermore, the jack 31 has a projection 37 pivoted to one end of a connecting rod 39 at 38. The other end of said connecting rod 39 is pivoted at 40 to an intermediate point of a lever 41.

The lower arm of the double armed lever 43 is pivoted at 43' to one end of a connecting link 44, which may be reciprocated by a crank drive connected with the power driven main shaft of the device. Such a crank drive, for example, is shown in Fig. 18.

A presser 46 is slidably arranged in the member or engaging means 45 attached to the upper arm of the double-armed lever 43. A spring 47 acting on the presser 46 tends to urge the latter into engagement with a notch 46' in the recess 36.

When the double-armed lever 43 is rocked from the position shown in Fig. 6 by the connecting rod 44 moving in the direction of arrow B and the jack 31 is held in its original position by a non-perforated portion of the Jacquard card 14 engaging the pin 35, the spring loaded presser 46, upon disengagement from the notch 46' in the recess 36, slides along the bottom surface of said recess 36. If, however, the jack 31 is not held in its original position because its pin 35 is in register with holes in the Jacquard card 14 and drum 13, the spring-loaded presser 46 remains in engagement with the notch 46', so that the jack 31 is swung by the double-armed lever 43 about the shaft 32 in counter-clockwise direction whereby the pin 35 may reach the position shown in dash lines.

The device shown in Figs. 6–10 has a set of four jacks 31, 31a, 31b, 31c. The first jack 31 has the above mentioned projection 37. The second jack 31a has the projection 48, the third jack 31b has the projection 49 and the fourth jack 31c has the projection 50.

Each of the projections 48, 49, 50 is pivoted at 48', 49', 50' respectively to a connecting rod 51, 52, 53 respectively. The connecting rod 51 is pivoted at 54 to the upper end of the above mentioned lever 41 (Figs. 6 and 8). The connecting rod 52 is pivoted at 52' to the lower end of another lever 55 (Figs. 6 and 9; in the position of Fig. 6, a portion of the lever 55, being behind the lever 41, is covered by said lever 41). The connecting rod 53 is pivoted at 53' to an intermediate point of said other lever 55 (Figs. 6 and 10). While the lever 41 is pivoted at 56 to a rocking lever 57, acting as a summarizing lever, the lever 55 is pivoted at 58 to said rocking lever 57. The lever 57 (comparable with the lever 17 of Figs. 1–4) is pivoted at 59 to one end of a link 20 provided with a rack (not shown in Fig. 6) for meshing engagement with a gear controlling the movements of an adjustable member as described above in connection with Figs. 1–4.

While according to the embodiment of Figs. 1–4 the lever 17 may swing about pivots 16 or 18 respectively when the latter are temporarily in a fixed position, the ends of the lever 57 of the embodiment shown in Fig. 6 are guided in grooves 60, 60'. The lower end of the lever 57 is curved so as to form a rolling curve, so that during a swinging movement of the lever 57 the upper end 59 thereof moves almost in a straight line. This feature is of importance for the meshing engagement of the rack on the link 20 with the associated gear controlling the adjustment of the member to be adjusted, as, thus, distortions in the degree of the adjustment are avoided.

As best shown in Fig. 6, the pivotal connections 32, 38, 49', 40 and 52' of the jacks 31, 31b and the connecting rods 39 and 52 as well as the pivotal connections 32, 48', 50', 54 and 53' of the jacks 31a and 31c and the connecting rods 51 and 53 are in alignment with each other when the mechanism is in its zero position, whereby a dead center position is obtained for holding the mechanism in said zero position.

The control of the mechanism in response to the various positions of the jacks 31, 31a, 31b, 31c may be gathered from Figs. 7–10. According to said illustration the pivots 56 and 58 serving as fulcrums for the rocking lever 57 change their position in dependence on the positions of the jacks 31, 31a, 31b, 31c and the connecting rods 39, 51, 52, 53 associated therewith. Thus, according to Figs. 7 and 8 the lever 57 swings about the pivot 58, while according to Figs. 9 and 10 the lever 57 swings about the pivot 56.

Thus, the various adjustments of the rocking levers 41 and 55 respectively with the connecting rods 39, 51, 52, 53 hinged thereto during the displacement of the four jacks 31, 31a, 31b, 31c of the set of jacks may be readily determined.

If the jacks 31, 31a, 31b, 31c with their projecting pins are moved towards a stationary Jacquard card, only those jacks will be displaced into an extreme position, the pins of which pass through holes of the Jacquard card. As for the manufacture of an embroidery pattern by use of the device of the present invention the number of jacks to be displaced is smaller than the number of jacks remaining in their original position, therefore the Jacquard card may be provided with a considerably smaller number of holes than hitherto customary in Jacquard cards used in connection with hitherto customary Jacquard devices wherein the displacement of the jacks is obtained by an abutment of the pins of the jacks against non-perforated portions of the Jacquard card.

Fig. 11 illustrates a Jacquard card 14 for use in connection with a controlling device according to the invention, wherein a displacement of the jacks occurs only when the pins of the jacks may pass through a hole 62 of the Jacquard card. 61 indicates the marginal holes for cooperation with the advancing mechanism (not shown) controlling the feed movement of the Jacquard card.

As, thus, the Jacquard card 14 used in connection with a controlling device according to the invention has less holes than hitherto customary Jacquard cards and as no force has to be exerted by the Jacquard card upon an engagement of a non-perforated portion thereof with a pin of a jack of the controlling device according to the invention, the wear and tear of the Jacquard card and of the controlling elements of the controlling device is considerably reduced.

Furthermore, all holes 62 of a controlling row a, a', a" . . . of the Jacquard card 14 according to the invention may be brought into alignment with each other, while in hitherto customary Jacquard cards some of the holes must be arranged somewhat below the row of holes proper, offset to the holes of said row of holes, as there is not sufficient space for arranging all the necessary holes in one and the same row. If a Jacquard card according to the invention, is to be prepared for the same pattern which requires the offset arrangement of holes in hitherto customary Jacquard cards the individual rows of holes 62a (see Fig. 12, left hand portion) of the Jacquard 14a according to the invention may be even arranged nearer to each other, whereby the Jacquard card may be considerably shortened.

While according to the embodiment shown in Fig. 11 the distance between the marginal holes 61 for cooperation with the advancing mechanism corresponds to the pitch of the Jacquard automat, according to the embodiment shown in Fig. 12, the step by step advance of the feed drum having pins cooperating with the marginal holes 61a of the Jacquard card 14a must be smaller than the distance between two adjacent marginal holes 61a, for example only half the distance.

Furthermore, the beginning and the end of each Jacquard card according to the invention is free from rows of holes as shown in the right hand portion of Fig. 12, so that the jacks of the Jacquard device are not displaced during their cooperation with said non-perforated portions of the Jacquard card. This feature results in an improved stability of the Jacquard card in contrast to the hitherto customary Jacquard cards wherein the beginning and the end of the latter are provided with full rows of holes.

Moreover, since the beginning of the Jacquard card 14a is free from rows of holes, the embroidery machine and Jacquard automat may be brought to normal operating speed before displacements of the jacks in accordance with the embroidery pattern take place. On the other hand, owing to the elimination of rows of holes at the end of a Jacquard card, the Jacquard automat may come to a rest, after the completion of the embroidery pattern, without further displacement of the jacks.

According to the embodiment shown in Figs. 13–15 an actuating member 101 swingably mounted on a shaft 104 may be reciprocated by means of connecting rod 102 which in turn is actuated by an eccentric (not shown) or a crank, for example of the type shown in Fig. 16. The stationary shaft 104 is carried by walls of a casing 103. The upper bar 105 of the stirrup-like member or rocker 101 carries a series of detent or locking means 100, each comprising a bolt 106, a spring 107 and a threaded plug 108 having a bore receiving the thin end of the bolt 106. The spring 107 abutting against the plug 108 and the shoulder of the bolt 106 tends to urge the bolt 106 guided in a bore of the bar 105 against an associated jack 110, 110a, 111, 111a, 112, 112a, 113 or 113a respectively.

As best shown in Fig. 14, the jacks of the four pairs of jacks 110—110a, 111—111a, 112—112a and 113—113a swingably arranged on the shaft 104 within the actuating member 101 are held in proper distance from each other by means of spacers 114 and 115. Furthermore two set collars 116 are mounted on the shaft 104, by means of which the lateral position of the four pairs of jacks 110—110a, 111—111a, 112—112a, 113—113a relative to the actuating member 101 may be accurately adjusted. Each of the jacks 110, 110a, 111, 111a, 112, 112a, 113, 113a has at its front end a pin or feeler 117 (only one being shown) which is moved towards the Jacquard card 118 upon a displacement of the jacks in counter-clockwise direction as viewed in Fig. 13. The Jacquard card 118 is trained around the Jacquard drum 119 provided with rows of holes 120 suitable for any arrangement of holes in the Jacquard card 118. The Jacquard drum 119 may be rotated step by step around the shaft 121 in accordance with the pitch of holes of the Jacquard card 118 by means of an advancing mechanism (not shown).

As soon as a pin 117 of a jack is in register with a hole of the Jacquard card 118, the actuating member 101 can cause a displacement of the jack carrying such a pin, so that the latter passing through the registering holes of the Jacquard card 118 and the drum 119 reaches the position 117' shown in dash lines in Fig. 13. At the same time the jacks cause a movement of the connecting rods 122, 123, 124, 125 in the manner described above in connection with Figs. 6–10. Said connecting rods 122, 123, 124, 125 being connected with a suitable linkage cause movements of the two racks of a component work of a Jacquard or embroidery automat through a differential gear.

During such movements of the jacks 110, 110a 111, 111a, 112, 112a, 113, 113a the latter are guided, on one hand, by means of the bearing plate 127 near the point of feeling engagement of the pins 117 of the jacks with the Jacquard card 118 and, on the other hand, by the lateral guidance of the moving actuating member 101.

According to the embodiment shown in Figs. 13 and 14 each bolt 106 has a groove or slot 126 preventing the jacks 110, 110a, 111, 111a, 112, 112a, 113, 113a from lateral displacement. If desired, however, the guiding of the jacks could also be obtained by providing the lower portion of the upper bar 105 with comb-like recesses; in such a case the bolts 106 do not have to guide the jacks.

The bearing plate 127 being attached to the front portion of the casing 103 is provided with a series of slots or recesses 128 at its end opposite to its end of attachment to the casing 103. The slots 128 are arranged for guiding the pins 117 of the jacks. Thus an accurate feeling engagement between the pins 117 and the Jacquard card 118 may be obtained even in machines, for example embroidery automats, running at high speeds.

The end of the bearing plate 127 provided with the slots or recesses 128 abuts against the front end of a counter plate 129 attached to the casing 103. Thus, the bearing plate 127 and counter plate 129 close the aperture of the casing so that only the ends of the pins 117 project outwardly. A sealing strip 130 of felt or the like attached to the bearing plate 127 and covering the slots 128 prevent oil and oil spray from leaving the casing 103. Furthermore, said sealing strip 130 removes excess oil from the pins 117 during their passage through the slots 128 or provides the pins 117 with a thin film of oil respectively, so that the Jacquard card will be kept clean at all times.

Furthermore, the guiding of the jacks and their pins according to the invention reduces considerably the friction of the jacks, so that only small forces are required for the movements of the jacks. This is another feature rendering the controlling device according to the invention very advantageous for fast running embroidery automats or Jacquard automats.

Figs. 16–20 illustrate the driving means of a controlling mechanism according to the invention.

As best shown in Figs. 16–18, all elements of the controlling mechanism, for example an embroidery automat, are driven by the main crank shaft 201. Fig. 16 illustrates the crank 202 in dead center position. Said crank 202 is pivotally connected with one end of a connecting rod 203, the other end of which is hinged to an arm 204 swingably mounted on the shaft 208 carried by the wall of a casing (not shown). In the position shown in Fig. 16, an actuating element 205 rigid with the arm 204 abuts against a projection 206 of a jack 207 swingably mounted on the shaft 208. Furthermore, the projection 206 is in engagement with an abutment 209 of the casing or frame. The jack 207 is pivoted at 220 to one end of a connecting rod 210, the other end of which is pivoted at 221 to a rocking lever 211 being swingable around the pivot 212. The upper end of the rocking lever 211 is pivoted at 213 to the summarizing lever 214 being swingable about the pivot 200. The upper end of said summarizing lever 214 is pivoted at 215 to one end of an actuating bar 216, the other end of which is provided with a rack 217. Said rack 217 may mesh with teeth 218 of a gear 219 operatively connected with the embroidering frame (not shown) or a frame (not shown) carrying embroidering frames. A rotation of the gear 219 causes a displacement of such an embroidering frame.

The linkage 210, 211 is in a dead center position when the axes of the shaft 208, the pivot 220 and the pivot 221 are in alignment with each other as shown in Fig. 16.

Thus, in the position illustrated by Fig. 16, the crank drive 201, 202 and the linkage 210, 211 are in dead center position. Therefore, if the crank 202 passes over the dead center position, a slight change in the position of the linkage 210, 211 may occur without causing a noticeable displacement of the actuating bar 216, so that from a practical point of view the standstill of the actuating bar 216 is slightly extended for permitting meanwhile a disengagement of the rack 217 from the gear 219.

Such a disengagement of the rack 217 from the gear 219 is carried out by a linkage 222, 223, 226, 228, 229, 231, 233 likewise controlled by the crank 202. The crank 202 is pivoted at 202' to one end of the connecting rod 222, the other end of which is pivoted to one arm of a double-armed lever 223 swingably mounted on a fixed pivot 224. The other arm of said double-armed lever 223 is pivoted at 225 to one end of a link 226, the other end of which is pivoted at 227 to an articulated lever 228, 229. The lower end of said articulated lever 228, 229 is swingably mounted at 230 on a stationary point of the device. The upper end of the articulated lever 228, 229 is pivoted at 229' to an arm 231 swingably mounted at 232 on a stationary point of the device. Another arm 233 rigid with the first mentioned arm 231 is pivoted at 233' to a slide 234 slidably arranged in a guiding channel 235 of the rack portion 217 of the actuating bar 216.

When the crank 202 is rotated in clockwise directing from the position shown in Fig. 16 into the position shown in Fig. 17 the rack 217 is immediately disengaged from the gear 219, as the linkage 222, 223, 226, brings the elements of the articulated lever 228, 229 into the position shown in Fig. 17, whereby the arms 231 and 233 are swung downwardly to such an extent that the slide 234 causes a downward movement of the rack 217 for disengagement of the latter from the gear 219.

During a rotation of the crank 202 through 180° from the position shown in Fig. 16 into a diametrically opposite position, i.e. during the first half of a revolution of the crank 202, the rack 217 is held out of engagement with the gear 219. During said half revolution of the crank 202 the double-armed lever 223 reaches the position shown in Fig. 17 when upon a rotation through 90° from dead center the crank 202 is in its middle vertical position. During a continuation of the rotation of the crank 202 through 90° from said vertical position into the position diametrically opposite to the dead center position shown in Fig. 16 the double-armed lever 223 returns to the position shown in full lines in said Fig. 16. During the course of a subsequent half rotation of the crank 202 through 180° from said position diametrically opposite to the position shown in Fig. 16 into the position shown in said Fig. 16 the double-armed lever reaches the position 223a shown in dash lines in Fig. 16. Said position 223a is beyond the straight line position of the linkage 223, 226 shown in dash and dot lines in Fig. 16. During the movement of the doubled-armed lever 223 from the full line position of Fig. 16 into the position 223a and back into said full line position while the crank 202 performs said second half of its revolution, the articulated lever 228, 229 is moved from its full line position of Fig. 16 into the dash line position 228a, 229a and back into said full line position. This slight movement of the articulated lever 228, 229 beyond its dead center position 228b, 229b and back into its original position 228, 229 has practically no influence on the position of the rack 217.

In order to prevent undesired movements of the embroidering frame controlled by the rack 217 when the rack 217 is disengaged from the gear 219, the gear 219 is locked by a locking pawl 236 arranged at the end of an arm 237 swingably mounted on a stationary pivot 238. The locking arm 236, 237 is controlled by the following mechanism:

The right hand end (as viewed in Fig. 16) of an articulated lever 240, 241 is pivoted to the arm 237 at 239. The other end of said articulated lever 240, 241 is swingably mounted on a fixed point 243. One end of a link 245 is hinged to the pivotal connection 242 between the elements 240, 241 of the articulated lever 240, 241. The other end of the link 245 is pivoted at 246 to an arm 244 rigidly connected with the double-armed lever 223 so as to participate in the movements of the latter.

It may be readily understood by the illustrations of Figs. 16–18, that during the various positions of the crank 202 the locking pawls 236 is in locking engagement with the gear 219 as long as the rack 217 is disengaged from the gear 219, while said locking pawl 236 is disengaged from the gear 219 as long as the rack 217 is engaged with the gear 219.

It will be further understood that the engaging or disengaging respectively of the locking pawl 236 must take place at the same time when the rack 217 is being disengaged or engaged respectively. The carrying out of said engagements and disengagements requires a certain time, although a short one. According to the invention the short standstill of the linkage in the dead center positions and the small buckling of the articulated levers 228, 229 and 240, 241 respectively are utilized for causing the engagements and disengagements to take place during this time interval.

When, upon a rotation through 180° from the position shown in Fig. 16, the crank 202 reaches the diametrically opposite position, thus establishing the second dead center position with respect to the connecting rod 203, the arm 204 is in the position shown in Fig. 18. If a pin or feeler 257 of a jack 207 is in register with a hole of a Jacquard card (not shown in Fig. 18) trained around a drum 263, a spring-loaded presser 247 abutting against a curved surface 248 of the jack 207 and arranged in the actuating member 205 causes a counter-clockwise rotation of the jack 207 around the shaft 208 during a clockwise rotation of the crank 202 from the position shown in Fig. 16 into the position shown in Fig. 18, until the projection 206 of the jack 207 abuts against a stop 249 arranged on the casing or frame. After the stopping of the jack 207 in the position shown in Fig. 18, the actuating member 205 may continue somewhat its counter-clockwise rotation until the crank 202 establishes above mentioned second dead center position of the crank drive 202, 203; during this continued movement of the actuating member 205 the spring-loaded presser 247 slides along the curved surface 248 of the jack 207 held in its position by the stop 249.

As the change in the positions of the rack 217 and the locking pawl 236 takes place at this moment, said additional movement of the actuating member 205 after the stopping of the jack 207 increases the time interval wherein the linkage connected with the jack 207 is in the dead center position, so that the engagement of the locking pawl 236 with the gear 219 and the disengagement of the rack 217 from the gear 219 may be safely carried out.

While according to the embodiment shown in Figs. 16–18 the dead center positions of the mechanism and the small degree of buckling of the articulated levers 228, 229 and 240, 241 respectively are utilized for obtaining the interval of standstill for the engagement and disengagement respectively of the rack 217 and the locking pawl 236, the embodiment illustrated by Fig. 19 discloses a different solution of the same problem by means of a particular linkage controlled by the crank shaft, wherein the movements of certain elements along predetermined paths are utilized for obtaining the timed engagements and disengagements of the rack and the locking pawl.

According to Fig. 19 the double-armed lever 323, corresponding to the double-armed lever 223 described above in connection with Figs. 16–18, is swingably mounted on the stationary shaft 324. The double-armed lever 323 of Fig. 19 may be rocked by means of a connecting rod 322 driven by a crank (not shown in Fig. 19) corresponding to the crank 202 of Figs. 16–18. According to Fig. 19 one end of a connecting rod 350 is pivoted to the arm 344 rigidly connected with the double-armed lever 323. The other end of said connecting rod 350 is pivoted at 351 to a rocking lever 352 swingably mounted on a fixed point 353 of the device. Thus the members 344, 350 and 352 form the movable links of a four-bar link-system including the portion of the device between the pivots 324 and 353 as a stationary link. The upper end of a link 355 is pivoted to the connecting rod 350 at 354. The lower end of the link 355 is pivoted at 356 to one arm of a bell-crank lever 337 swingably mounted on a fixed point 338 of the device. The other arm of said bell-crank lever 337 carries the locking pawl 336.

When the arm 344 rigidly connected with the double-armed lever 323 is reciprocated by means of the connecting rod 322, the pivot 354 travels along a curved path x shown in dash lines during a movement of the arm 344 in counter-clockwise direction as viewed in Fig. 19. The path x is determined by the movement of the link 355, the pivot 356 of which remains in its position during said movement. This also results in the resting position of the pawl lever 337 being maintained so that there is a sufficiently long standstill for the engagement of the locking pawl 336 into the gear 319. During a return movement of the arm 344 in clockwise direction, at first the pivot 354 returns along the path x into the full line position shown in Fig. 19. During a continuation of the clockwise movement of the arm 344 beyond the full line position shown in Fig. 19, the pivot 354 travels along the curved path y shown in dash and dot lines. During this movement the pivot 356 is displaced downwardly into the position 356a whereby at the same time the pawl lever 337 is swung into the position 337a shown in dash and dot lines, causing a disengagement of the locking pawl 336 from the gear 319.

The rack 317 is controlled by the linkage 350', 352', 355', 337' being arranged in reverse to the above described linkage 350, 352, 355, 337 for the control of the locking pawl 336. The link 350' is pivoted to the right hand arm of the double-armed lever 323. The pivot 354' travels along the paths x' and y' respectively corresponding to the paths x and y travelled by the pivot 354 when the double-armed lever 323 is reciprocated.

Thus, the rack 317 is held for a while in engagement with the tooth 319 although the mechanism driven by a crank drive (corresponding to the crank drive 202 shown in Figs. 16–18) continues its movements.

The step by step rotation of the Jacquard drum 263 (Figs. 16–18 and 20) for advancing the Jacquard card (not shown) can take place only when the pin 257 of the jack 207 is disengaged from the holes of said drum and card. Therefore, the rotation of the Jacquard drum 263 keyed to a rotatable shaft 262 must be in predetermined relationship to the positions of the elements of the controlling mechanism, for example the controlling mechanism shown in Figs. 16–18.

The pin 257 penetrates into a hole of the Jacquard card and a registering hole of the Jacquard drum 263 during a movement of the crank 202 from the position shown in Fig. 16 into the position shown in Fig. 18. On the other hand, the pin 257 is withdrawn from said holes of the Jacquard drum and Jacquard card when the crank 202 is moved from the position shown in Fig. 18 into the position shown in Fig. 16. Therefore, if the mechanism for advancing the drum 263 step by step is actuated by the main shaft 201 carrying the crank 202, the advancing of the drum 263 must not take place during the movement of the crank 202 from the position shown in Fig. 16 into the position shown in Fig. 18 and during the movement of said crank 202 from the position shown in Fig. 18 into the position shown in Fig. 16. In other words, the step by step advancing of the drum 263 can take place only at the moment when the crank 202 is in the dead center position shown in Fig. 16.

According to the embodiment shown in Figs. 16–18 and 20, a gear 259 keyed to the crank shaft 201 is in mesh with a gear 260 keyed to a shaft 261 journalled in suitable bearings of the device. A disc 258 also keyed to the shaft 261 carries a substantially concentrical annular rim 265 split at 266 (see Fig. 20). The ends of the split rim 265 overlap each other at 266, one end being bent outwardly. Said rim 265 cooperates with teeth of a feed gear wheel 264 keyed to the shaft 262 carrying the drum 263 so that each time when a tooth of the feed gear wheel 264 being engaged by the outwardly projecting end of the rim 265 is introduced into and passed through the space between the overlapping ends of the rim 265 at 266 the feed gear wheel 264 and the drum 263 operatively connected therewith are advanced one step.

The mechanism can be arranged in such a way, that the pin 257 of the jack 207 is disengaged from the holes of the Jacquard drum 263 and the Jacquard card just at the moment when the crank 202 reaches the dead center position shown in Fig. 16 and that at this moment the advancement of the drum 263 by one step by means of the feed disc 258, 265 and the feed gear wheel 264 cooperating with each other takes place. The distance of the end of the withdrawn pin 257 from the Jacquard card may be very small, so that upon a continuation of the rotation of the crank 202 the pin 257 may immediately enter into registering holes of the Jacquard card and drum 263.

According to the embodiment shown in Figs. 16–18 a single crank 202 is used for the driving of the actuating member 205 and for the control of the linkages effecting the engagement and disengagement respectively of the rack 217 and the locking pawl 236 with the gear 219. In order to render this arrangement possible the connecting rod 203 connecting the crank 202 with the arm 204 and the connecting rod 222 connecting the crank 202 with the double-armed lever 223 are arranged at an angle of approximately 90° to each other. If, however, for reasons of design the connecting rods 203 and 222 cannot be arranged at an angle of 90° to each other, but must be arranged at a different angle relative to each other, two cranks, one for each of said connecting rods, should be arranged on the main shaft 201.

We have described preferred embodiments of our invention, but it is understood that this disclosure is for the purpose of illustration, and that various omissions and changes in shape, proportion and arrangement of parts, as well as the substitution of equivalent elements for the arrangements shown and described may be made without departing from the spirit and scope of the invention as set forth in the appended claims.

Although the controlling device according to the invention is described in connection with a Jacquard automat for an embroidery machine, it may be used also for the control of controllable elements of different types of machines.

What we claim is:

1. A controlling device, especially an automat for controlling movements of a controllable element of a textile machine, comprising: a movable controlling member having a plurality of rows of holes, a series of jacks, a feeler fixedly arranged on each jack, said jacks together with their feelers being movable towards and away from said controlling member between a starting position and an end position, each feeler being capable of passing through a hole of a row of holes being in cooperative position relative to such a feeler, feeding means for feeding said controlling member so as to bring its rows of holes successively into cooperative position relative to said series of feelers, actuating means for moving said series of jacks towards and away from said controlling member, and frictional cooperating surfaces mutually entrainable for operatively connecting said actuating means with said series of jacks, said surfaces being mutually slidable under increased shearing forces respectively applied to said cooperating surfaces, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member, and connecting means operatively connected with said jacks for control of the controllable element of the machine.

2. In a controlling device as claimed in claim 1, said jacks being rockable around a fixed axis.

3. In a controlling device as claimed in claim 1, said actuating means including spring-loaded pressure means in abutting engagement with said jacks.

4. In a controlling device as claimed in claim 1, said actuating means supporting said jacks.

5. In a controlling device as claimed in claim 1, said feelers being curved and said actuating means including a rocker for moving predetermined ones of said jacks toward and away from said controlling member, and a shaft, said rocker and said jacks being rockable about the axis of said shaft, and detent means yieldably biased between said rocker and said jacks.

6. In a controlling device as claimed in claim 1, said actuating means including a rocker, a shaft, said rocker and said jacks being rockable about the axis of said shaft, each jack having a curved surface with a radius starting from the center of said shaft, and spring-loaded pressure means arranged on said rocker and frictionally engaged with said curved surfaces of said jacks, said feelers being curved, and the radius of said curved feelers starting from the center of said shaft being larger than the radius of said curved surfaces of said jacks.

7. In a controlling device as claimed in claim 1, said actuating means including a rocker, a shaft, said rocker and said jacks being rockable about the axis of said shaft, a portion of said rocker extending along said series of jacks and having a series of recesses equal in number to the number of jacks, and each of said jacks being engaged with one of said recesses.

8. A controlling device, especiallly an automat for controlling movements of a controllable element of a textile machine, comprising: a movable controlling member having a plurality of rows of holes, a series of jacks, a feeler fixedly arranged on each jack, said jacks together with their feelers being movable towards and away from said controlling member between a starting position and an end position, each feeler being capable of passing through a hole of a row of holes being in cooperative position relative to such a feeler, feeding means for feeding said controlling member so as to bring its rows of holes successively into cooperative position relative to said series of feelers, actuating means yieldingly engaged with said series of jacks for moving same towards and away from said controlling member, said actuating means being capable of moving those jacks from their starting position into their end position the feelers of which are in cooperative position relative to holes of the controlling member and may pass through the latter while said actuating means may leave th remaining jacks in an intermediate position upon engagement of their feelers with non-perforated portions of said controlling member, and connecting means operatively connected with said jacks for control of the controllable element of the machine, said actuating means including a rocker, a shaft, said rocker and said jacks being rockable about the axis of said shaft, a portion of said rocker extending along said series of jacks, a series of spring-loaded pressure means, equal in number to the number of jacks, arranged on said portion of said rocker, each pressure means having a recess, and each jack being engaged with a recess of a pressure means.

9. In a controlling device as claimed in claim 1, a stationary plate having a series of slots equal in number to the number of feelers, each feeler being arranged for passage through one of said slots during a movement of the associated jack from said starting position to said end position.

10. In a controlling device as claimed in claim 1, a stationary plate having a series of slots equal in number to the number of feelers, each feeler being arranged for passage through one of said slots during a movement of the associated jack from said starting position to said end position, and sealing means arranged on said plate for sealing said slots, said sealing means permitting a passage of said feelers through said slots.

11. A controlling device, especially an automat for controlling movements of a controllable element of a textile machine, comprising: a movable controlling member having a plurality of rows of holes, a set of four jacks, a feeler arranged on each jack, said together with their feelers being swingable around a common axis towards and away from said controlling member between a starting position and an end position, each feeler being capable of passing through a hole of a row of holes being in cooperative position relative to such a feeler, actuating means yieldingly engaged with said set of jacks for swinging same towards and away from said controlling member, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member, a first link, a first connecting rod pivoted at a first pivot to the first jack and to said first link at an intermediate point thereof, a second connecting rod pivoted at a second pivot to the second jack and to an end portion of said first link, a second link, a third connecting rod pivoted at a third pivot to the third jack and to one end portion of said second link, a fourth connecting rod pivoted at a fourth pivot to the fourth jack and to said second link at an intermediate point thereof, a rockable summarizing lever, the other end portion of said first link and the other end portion of said second link being pivoted to said summarizing lever intermediate the ends thereof at spaced points, and a connecting member pivoted to said summarizing lever, said connecting member being capable of controlling the controllable element of the machine.

12. In a controlling device as claimed in claim 11, the zero position of said summarizing lever being determined by the dead center positions of the linkages connecting the jacks with the first and second links.

13. In a controlling device as claimed in calim 11, the radii extending from said common axis on the pivotal connections between the jacks to said various pivots of said connecting rods being of different lengths.

14. In a controlling device as claimed in claim 11, a stationary surface, and a curved surface on said summarizing lever, said curved surface being in abutting engagement with said stationary surface for rocking movements of said summarizing lever relative to said stationary surface.

15. In a position controlling device for an embroidery machine, which device has a perforated Jacquard card in a plurality of jacks movable in relation to said card; a plurality of feeler pins each fixedly attached to a respective one of said jacks for sensing openings in perforated portions of said card, driven engaging means for engaging and selectively moving any and all of said feeler pins of said jacks toward and away from said card, and frictional cooperating surfaces respectively associated with said engaging means and said jacks and mutually entrainable for disengageably joining said engaging means to said jacks, whereby said jacks whose feeler pins abut against an imperforate portion of said card are withdrawn from the driving action of said engaging means.

16. A controlling device, especially an automat for controlling movements of a controllable element of a textile machine, comprising: a movable controlling member having a plurality of rows of holes, a series of jacks reciprocable in a straight line direction, a feeler fixedly arranged on each jack, said jacks together with their feelers being movable towards and away from said controlling member between a starting position and an end position, each feeler being capable of passing through a hole of a row of holes being in cooperative position relative to such a feeler, feeding means for feeding said controlling member so as to bring its rows of holes successively into cooperative position relative to said series of feelers, actuating means for moving said series of jacks towards and away from said controlling member, and frictional cooperating surfaces mutually entrainable for operatively connecting said actuating means with said series of jacks, said surfaces being mutually slidable under increased shearing forces respectively applied to said cooperating surfaces, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member due to the creation of said shearing forces thereby, and connecting means operatively connected with said jacks for control of the controllable element of the machine.

17. A controlling device, especially an automat for controlling movements of a controllable element of a textile machine, comprising: a movable controlling member having a plurality of rows of holes, a series of jacks reciprocable in a straight line direction, a feeler fixedly arranged on each jack, said jacks together with their feelers being movable towards and away from said controlling member between a starting position and an end position, each feeler being capable of passing through a hole of a row of holes being in cooperative position relative to such a feeler, feeding means for feeding said controlling member so as to bring its rows of holes successively into cooperative position relative to said series of feelers, actuating means for moving said series of jacks towards and away from said controlling member, said actuating means being in the shape of a reciprocable slide, and said jacks being slidably arranged in said slide, and frictional cooperating surfaces mutually entrainable for operatively connecting said actuating means with said series of jacks, said surfaces being mutually slidable under increased shearing forces respectively applied to said cooperating surfaces, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member due to the creating of said shearing forces thereby, and connecting means operatively connected with said jacks for control of the controllable element of the machine.

18. A controlling device, especially an automat for controlling movements of a controllable element of a textile machine, comprising: a movable controlling member having a plurality of rows of holes, a series of jacks reciprocable in a straight line direction, a feeler fixedly arranged on each jack, said jacks together with their feelers being movable towards and away from said controlling member between a starting position and an end position, each feeler being cabale of passing through a hole of a row of holes being in cooperative position relative to such a feeler, feeding means for feeding said controlling member so as to bring its rows of holes successively into cooperative position relative to said series of feelers, actuating means for moving said series of jacks towards and away from said controlling member, said actuating means being in the shape of a reciprocable slide, and said jacks being slidably arranged in said slide, said actuating means including spring-loaded pressure means, and said pressure means being in abutting engagement with said jacks, to provide frictional cooperating surfaces mutually entrainable for operatively connecting said actuating means with said series of jacks, said surfaces being mutually slidable under increased shearing forces respectively applied to said cooperating surfaces, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member due to the creation of said shearing forces thereby, and connecting means operatively connected with said jacks for control of the controllable element of the machine.

19. A controlling device, especially an automat for controlling movements of a controllable element of a textile machine, comprising: a movable controlling member having a plurality of rows of holes, a series of jacks reciprocable in a straight line direction, a feeler fixedly arranged on each jack, said jacks together with their feelers being movable towards and away from said controlling member between a starting position and an end position, each feeler being capable of passing through a hole for a row of holes being in cooperative position relative to such a feeler, feeding means for feeding said controlling member so as to bring its rows of holes successively into cooperative position relative to said series of feelers, actuating means for moving said series of jacks towards and away from said controlling member, said actuating means being in the shape of a reciprocable slide, and said jacks being slidably arranged in said slide, said actuating means including spring-loaded pressure means, and said pressure means being in abutting engagement with said jacks, to provide frictional cooperating surfaces mutually entrainable for operatively connecting said actuating means with said series of jacks, said surfaces being mutually slidable under increased shearing forces respectively applied to said cooperating surfaces, said actuating means being capable of moving those jacks from their starting position into their end position the feelers of which are in cooperative position relative to holes of the controlling member and may pass through the latter while said actuating means may leave the remaining jacks in an intermediate position upon engagement of their feelers with non-perforated portions of said controlling member due to the creation of said shearing forces thereby, and connecting means operatively connected with said jacks for control of the controllable element of the machine, the jacks of a pair of adjacent jacks having curved slots extending in opposite directions, said connecting means including a pair of bell-crank levers swingably mounted on a fixed point, one arm of each of said two bell-crank levers being in slidable engagement with a curved slot of one of said jacks, a rocking lever, the other arms of said bell-crank levers extending in opposite directions and being pivoted to said rocking lever at spaced points thereof, and an actuating element for control of the controllable element of the machine being pivoted to said rocking lever at an end portion thereof.

20. In a position control device, a controlled member and controlling means therefor comprising a perforated pattern card, actuating means reciprocated towards and away from said card, at least one pair of carrier members relatively yieldingly supported by said actuating means, and frictional cooperating surfaces mutually entrainable and slidable for operatively connecting said actuating means with said one pair of carrier members, feeler members upon said carrier members normally extending to a point close to said card, operatively to hold said carrier members in their normal position upon engagement of a solid portion of said card by their respective feeler members while allowing relative movement between said carrier members and said actuating means and to operate said carrier members by entrainment with said actuating means upon engaging a perforated portion of said card by their respective feeler members, and means operatively connecting each of said carrier members with said controlled member, to adjust the position thereof in a positive direction, respectively, in accordance with the perforation pattern of said card.

References Cited in the file of this patent

UNITED STATES PATENTS

| 1,093,142 | Maag | Apr. 14, 1914 |
| 1,707,263 | Gahlert et al. | Apr. 2, 1929 |
| 1,837,487 | Reynolds et al. | Dec. 22, 1931 |
| 2,085,459 | Wiget | June 29, 1937 |
| 2,324,221 | Luhn | July 13, 1943 |
| 2,609,841 | Turner | Sept. 9, 1952 |

FOREIGN PATENTS

| 484,178 | Great Britain | July 22, 1936 |
| 1,076,458 | France | Apr. 21, 1954 |